United States Patent [19]

Vandergriff et al.

[11] 4,079,677
[45] Mar. 21, 1978

[54] ADJUSTABLE CARGO BRACING BAR

[76] Inventors: Buford E. Vandergriff, 21 Redstart Rd.; Kerry E. Stokes, 1904 Woodfield Ct., both of Naperville, Ill. 60540

[21] Appl. No.: 734,128

[22] Filed: Oct. 20, 1976

Related U.S. Application Data

[63] Continuation-in-part of Ser. No. 594,530, Jul. 9, 1975, abandoned.

[51] Int. Cl.² .................... B60P 7/08; B60P 7/14; B61 45/00; B61 49/00
[52] U.S. Cl. ............................. 105/501; 105/503; 280/179 B
[58] Field of Search ............ 105/476, 497, 498, 499, 105/500, 501, 502, 503, 486, 495; 280/179 B

[56] References Cited

U.S. PATENT DOCUMENTS

| | | | |
|---|---|---|---|
| 1,868,638 | 7/1932 | Mackey | 105/503 |
| 2,659,319 | 11/1953 | Herman | 105/499 X |
| 2,806,436 | 9/1957 | Johnston | 105/503 |
| 2,983,232 | 5/1961 | Henrikson | 105/499 |
| 3,051,099 | 8/1962 | Robertson | 105/476 |
| 3,074,359 | 1/1963 | Chapman et al. | 105/500 |
| 3,327,648 | 6/1967 | Patch | 105/503 |
| 3,367,287 | 2/1968 | Dunlop | 105/498 X |
| 3,799,070 | 3/1974 | Munson | 105/501 |

Primary Examiner—Robert G. Sheridan
Assistant Examiner—Howard Beltran
Attorney, Agent, or Firm—Dominik, Knechtel, Godula & Demeur

[57] ABSTRACT

There is disclosed a bracing bar assembly for use in connection with a cargo container which includes a tubular freight bar having a hollow interior, a pair of upper and lower interiorly formed rails extending the length of the brace bar forming lock channels at each end of the brace bar, a lock assembly formed by a main body portion having a horizontally elongate configuration and sized so as to be slideably positionable within the lock channel, the exterior end of the main body portion of the lock assembly provided with a latch mechanism including a lower notched end and an upper end having a spring loaded finger latch and brace bar and lock assembly cooperating lock holding means to hold each of the lock assemblies in position within the lock channels of the brace bar to complete the assembly.

13 Claims, 8 Drawing Figures

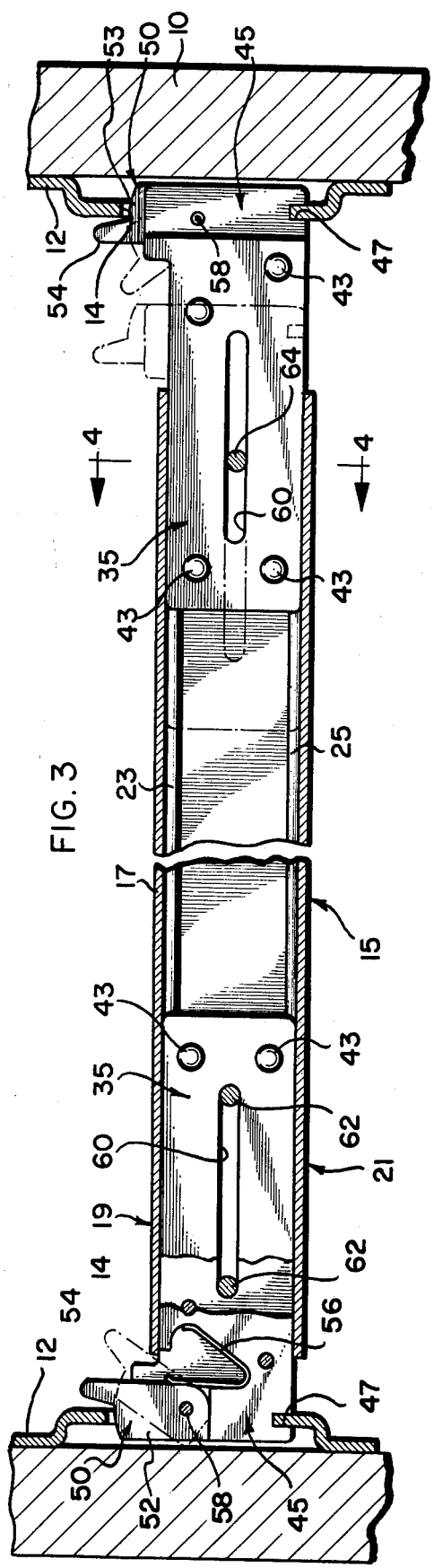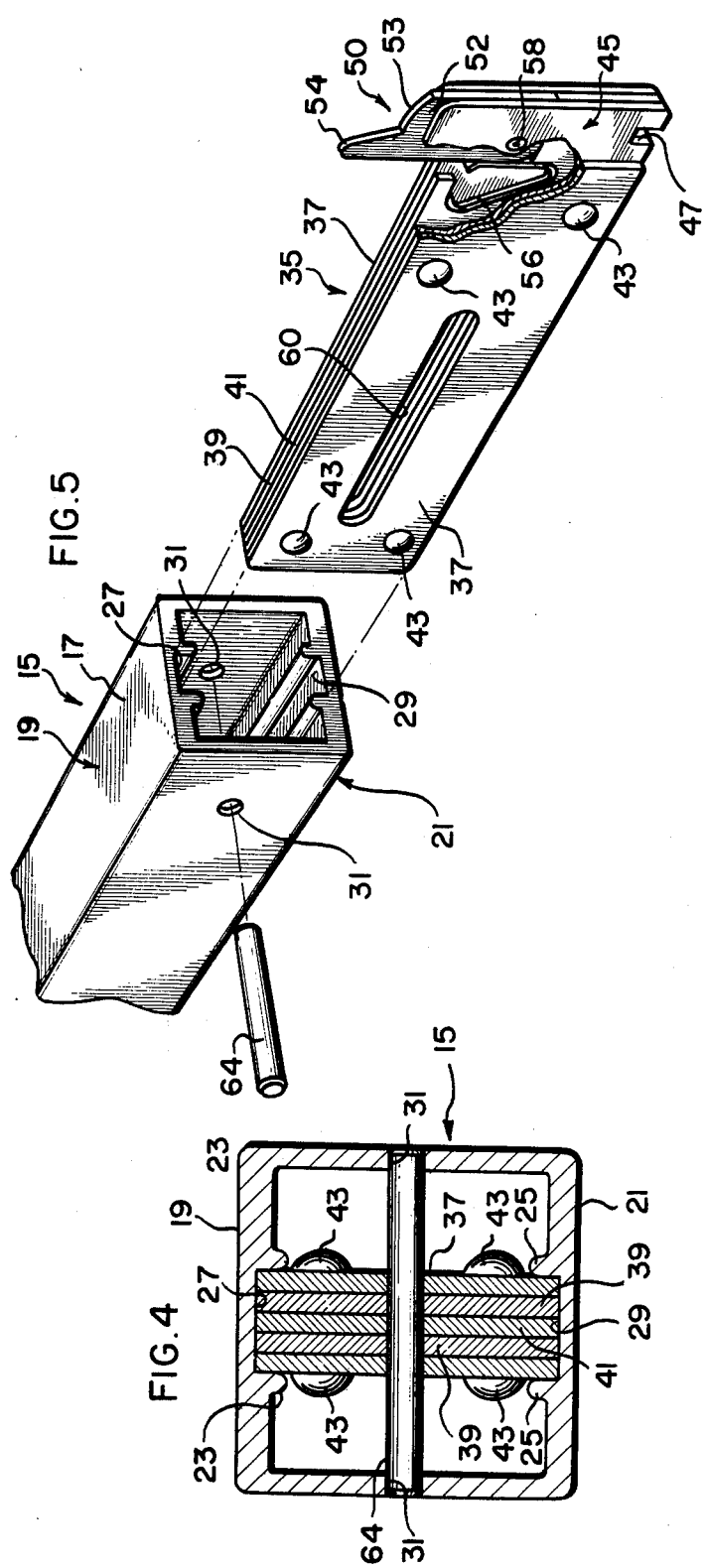

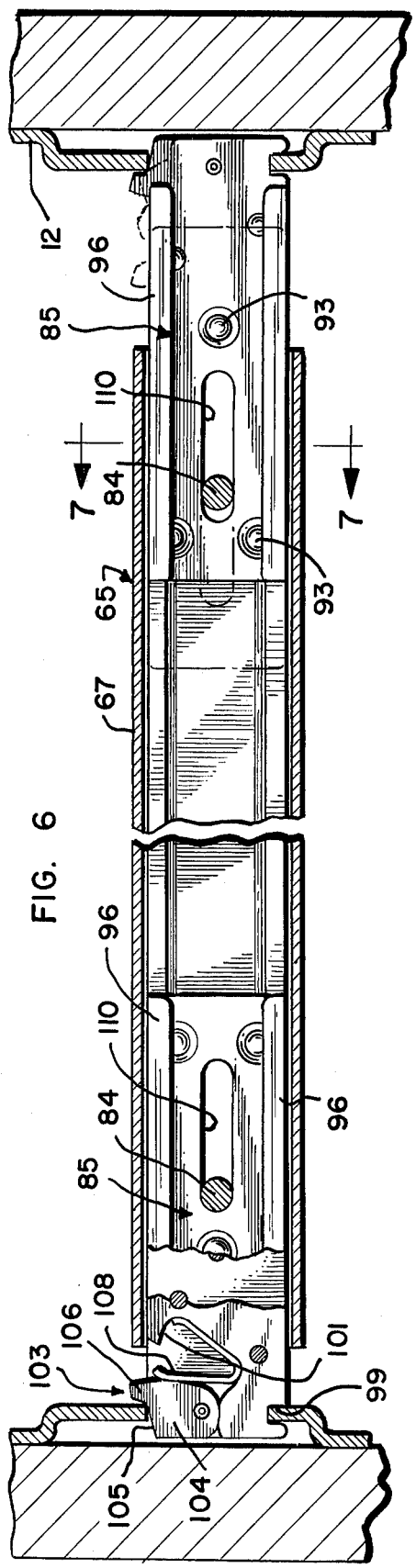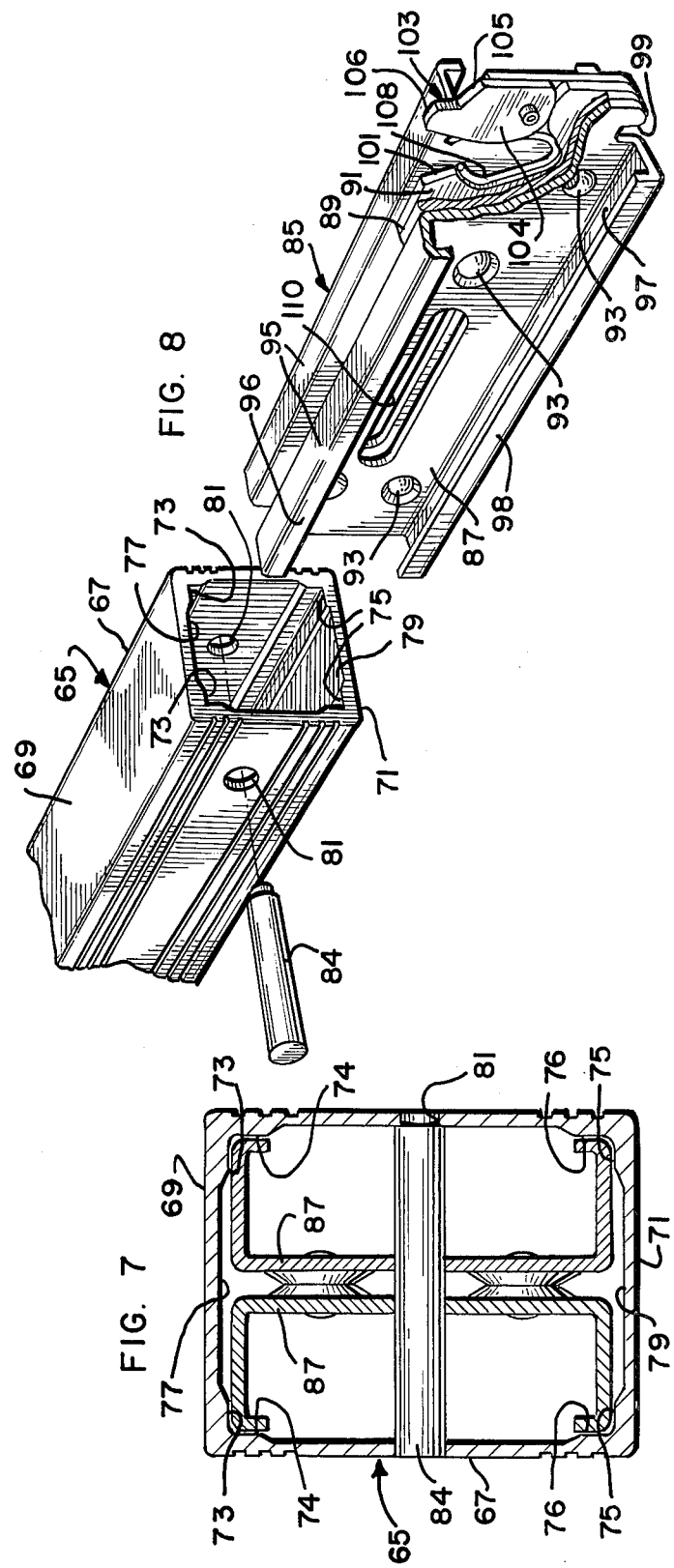

ADJUSTABLE CARGO BRACING BAR

BACKGROUND OF THE INVENTION

This application is a continuation-in-part of parent application, Ser. No. 594,530, filed July 9, 1975, now abandoned, in the name of Buford E. Vandergriff and Kerry E. Stokes, entitled CARGO BRACING BAR CONSTRUCTION.

A wide variety of bracing bar assemblies have been developed in the art each having as the main objective the bracing or holding of freight when stored within a cargo container. The most common forms of such brace bar assemblies are seen in railway and over-the-road trailers. The principal function of these assemblies is to retain cargo in its stacked configuration once the cargo has been loaded into the freight container, in most instances the cargo being retained on flat pallets for ease of loading and unloading at the shipping and receiving ends of the line. Generally, cargo which is positioned on flat pallets in order to simplify the task of loading and unloading the trailer by use of a forklift truck consists of a number of identical freight packages or cartons which are loose-stacked on a pallet. The brace bar is intended to be inserted within the cargo container and to be held in position against a load of freight such that the freight will be secure during the transport thereof from the shipping to receiving end.

In most of the common day freight carriers, the interior walls of the cargo container have been adapted to include a plurality of latch receiving slots in horizontal alignment such that a brace bar extended therebetween can be locked into position at any or a diverse number of placements within the cargo container. In addition, many of the cargo containers are provided with a series of such latch slots positioned at different points from the bottom to the top of the wall. In this manner, brace bars can be inserted either at a low vantage point, intermediate vantage point, or at an upper vantage point to achieve the best bracing effect.

A typical arrangement for an adjustable loading brace for cargo containers is shown in U.S. Pat. No. 1,868,638 which illustrates the use of a plurality of latch mechanism rails mounted on the side walls of the cargo container and positioned at low, intermediate, and upper vantage points. The brace bars extend from side to side and latch onto the appropriate latch rails such that the cargo may be braced and secured at any vertical level, as well as at any horizontal positioning. Another patent which shows another form of bracing assembly is U.S. Pat. No. 3,051,099 which shows another form of bracing system wherein both vertical and horizontal bracing bars are positionable within a cargo container to brace a variety of differently shaped cargo articles employing both lateral as well as transverse bracing bars. Another form of bracing system is shown in U.S. Pat. No. 3,327,658 which shows a system wherein side-to-side brace bars are positionable between lateral latch receiving bars such that the brace bar positioned between the latch receiving rails may similarly be positioned at any horizontal position as well as any vertical height.

One of the difficulties which has been inherent in systems heretofore available resides in the construction of the brace bar itself. The most common type of brace bar system employs a brace bar which is formed of a heavy steel material and is quite cumbersome to handle. In addition, the latch mechanisms employed in connection with these brace bars have a tendency to be formed of a number of elements and are therefore complicated in construction as well as difficult to handle. Furthermore, in most such assemblies, the means for holding the latch mechanism within the confines of the brace bar have either been intricate in terms of construction, or have required a number of pieces and elements such that the same are expensive to manufacture. For example, one such system employs a plurality of horizontal flat plates to incorporate the latch mechanism therein, and the plates in turn are held in position by means of a pair of upper and lower over-jaws, which retain the plates in position and are also sized such that the same are slideably positionable within a hollow tubular brace bar.

Various other of such brace bar assemblies are provided with sliding type latch pins which necessarily employ pin guides, coil springs, and the like, and are, therefore, susceptible to damage caused by stress, improper cocking of the springs, and the like.

SUMMARY OF THE INVENTION

The present invention provides a brace bar assembly which is simplified in construction and incorporates various features which simplify the construction of the brace bar, the means for holding the latch mechanism within the brace bar, and further simplifies the latch mechanism per se. More specifically, the brace bar of the present invention is designed to provide a pair of upper and lower rails formed unitarily with the brace bar and designed to retain the latch mechanism therein. The latch mechanism, in turn, is formed by a plurality of flat plates fixedly secured together and holding a finger latch in position therebetween in pivotal arrangement with a simple leaf spring to biasingly urge the finger latch into an upright position in its normal disposition. At least one of the latch mechanisms is slideably moveable within the confines of the upper and lower rails by the provision of a slot, the latch mechanism being held within the brace bar by pin means which fit within the slot to restrict the slideable movement of the latch mechanism to the area bounded by the confines of the slot. It is therefore contemplated that the brace bar of the present invention may be formed in a single extrusion process to form not only the brace bar, but also the upper and lower rails concomitantly during the manufacture of the brace bar, and the latch mechanism assembly is easily assembled by means of stacking a plurality of flat plates together and fixedly securing the same by means of rivets, with the finger latch being held between at least two of the flat plates, the finger latch being held in pivotal arrangement by means of a secondary rivet. In all, the manufacturing cost of the subject device has been greatly reduced while nevertheless providing a more simplified device which is easier to manipulate and sturdier when in use.

OBJECTS AND ADVANTAGES

The principal object of the present invention is, therefore, to provide a brace bar assembly which is formed from a unitarily constructed brace bar provided with upper and lower latch retaining rails, and a latch mechanism which nests within the channels formed by the rails such that extraneous elements necessary to hold the latch mechanism in position are eliminated.

A further object of the invention is to provide a brace bar assembly wherein the brace bar may be formed in a single manufacturing operation by simply extruding the same.

Still another object of the invention is to provide a brace bar assembly wherein the latch mechanism is formed simply by a plurality of flat plates riveted together and wherein the finger latch is held in position between two of the flat plates, the finger latch being riveted into position such that the same is pivotally moveable with a simple leaf spring in order to biasingly urge the finger latch into a normal upright block position.

Still a further object of the present invention is to provide a brace bar assembly which may be used in conjunction with a cargo container provided with a plurality of horizontally disposed lock slots on opposed side walls of the container, and a plurality of such rows of lock slots provided at different vertical heights within the container such that the brace bar assembly of the present invention may be employed at any vertical height or at any horizontal position within the cargo container.

In connection with the foregoing objects, it is still a further object of the invention to provide a brace bar assembly wherein at least one of the latch mechanisms incorporated within the brace bar is slideably moveable within the confines of the upper and lower latch rails by means of a slot positioned within the main body position of the latch mechanism, and a pin extending through the brace bar and through the slot of the latch mechanism and riveted into position such that the latch mechanism is permitted horizontally slideable movement at least to the extent of the confines of the slot positioned in the main body portion thereof.

Further features of the invention pertain to the particular arrangement of the elements and parts whereby the above-outlined and additional operating features thereof are attained.

The invention, both as to its organization and method of operation, together with the further objects and advantages thereof will best be understood by reference to the following specification, taken in connection with the accompanying drawings in which:

FIG. 3 is a side elevational view, in cross section, showing the details of construction of the brace bar assembly of the present invention, taken in the direction of the arrows along the line 3—3 of FIG. 1;

FIG. 4 is a cross sectional view showing the details of construction and the relationship between the latch mechanism and the brace bar taken in the direction of the arrows along the line 4—4 of FIG. 3; and FIG. 5 is a perspective, exploded view, showing the manner in which the latch mechanism is positioned within a corresponding brace bar and held in fixed position therein.

FIG. 6 is a side elevational view, in cross-section, showing the details of construction of an alternate embodiment of the bar assembly of the present invention as more particularly exemplified in FIGS. 7 and 8 following hereinbelow.

FIG. 7 is a cross-sectional view showing the details of construction of the alternate embodiment of the cargo brace bar assembly and latch mechanism, and the relationship between the latch mechanism and the brace bar; and FIG. 8 is a perspective, exploded view, showing the manner in which the latch mechanism is positioned within a corresponding brace bar, which is constructed to accommodate the latch mechanism shown in the alternate embodiment.

Figure 1:
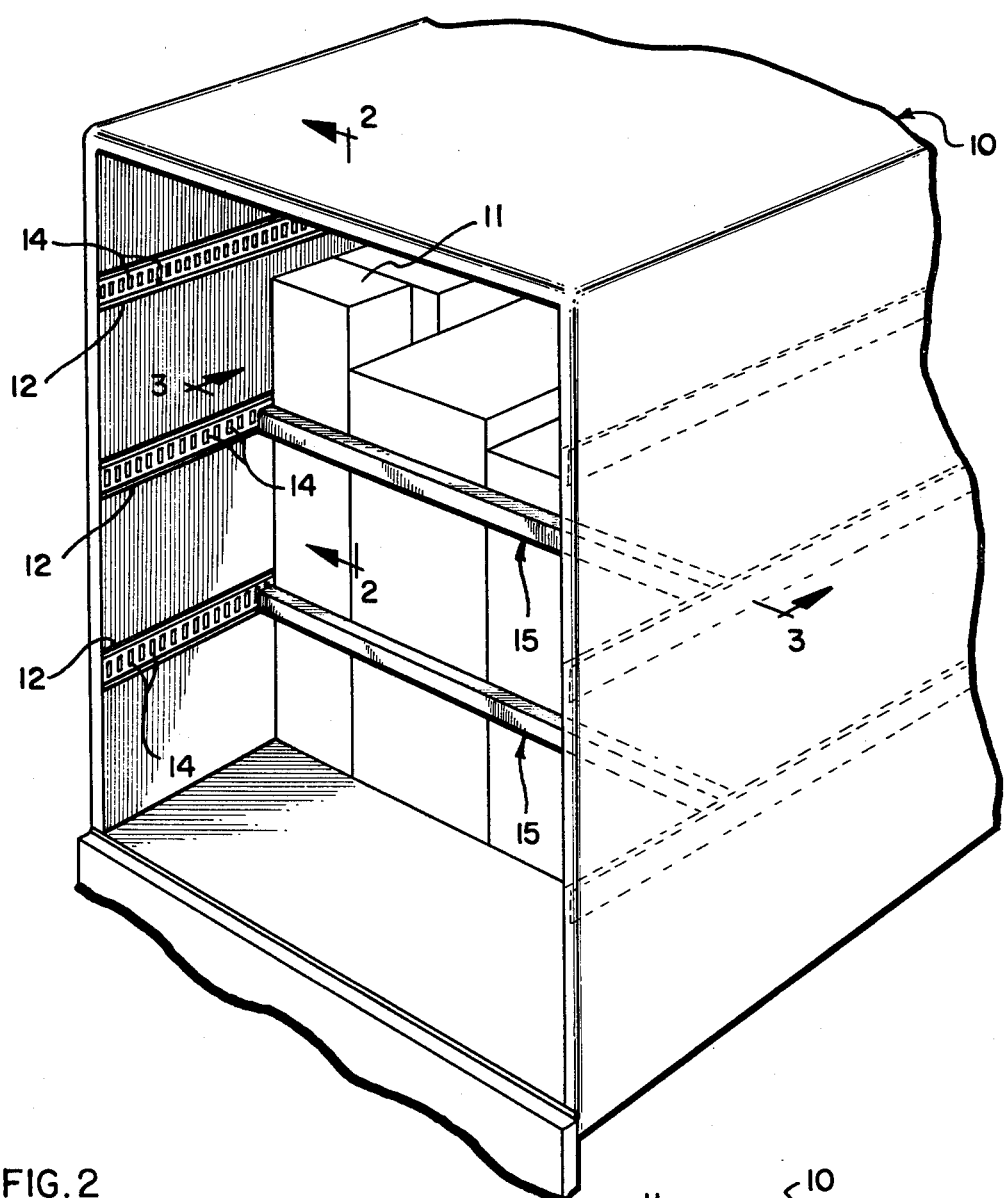
FIG. 1 is a perspective view of an exemplary cargo container having a pair of brace bars positioned therein showing the flexibility of employing the brace bar assembly at any vertical height and in any horizontal disposition.
Figure 2:
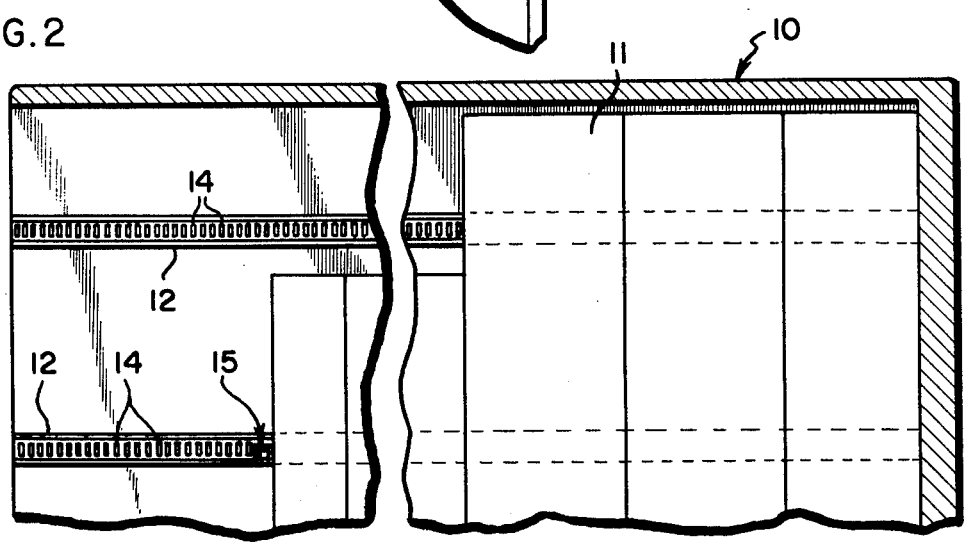
FIG. 2 is a side elevational, cross sectional view, showing the plurality of lock slots positioned in the side wall of the cargo container and one of the brace bars in position, taken in the direction of the arrows along the line 2—2 of FIG. 1.

With reference to FIGS. 1 and 2 of the drawing, a perspective view showing a typical cargo container 10 having a load of cargo 11 positioned therein is shown. As illuatrated in FIGS. 1 and 2 of the drawings, the cargo container 10 is provided with a plurality of lock rails 12 which are mounted to the opposed side walls of the container 10. Each of the lock rails 12 is provided with a plurality of horizontally positioned lock slots 14 which function to retain the brace bar 15 when inserted in position. It will also be observed that the lock rails 12 are positioned at a lower, intermediate and an upper height such as to permit the brace bars 15 to be positioned at any desired vertical height as well as in any horizontal disposition within the cargo container. Quite obviously, the positioning of each brace bar 15 is dependent upon the particular cargo 11 stored within the container 10 and the provision of a plurality of such lock rails 12 permits the operator flexibility in terms of positioning different brace bars 15 at different levels.

While the cargo 11 shown in FIG. 1 is shown to be positioned on the bottom floor of the cargo container 10, nevertheless, it will be apreciated that in most situations, the cargo 11 is positioned on pallets (not shown) which are positioned within the cargo container by means of transport vehicles such as forklift trucks or the like. Where such a loading and unloading system is provided, the provision of brace bars 15 of the type shown and described in the present invention permit the operator to simply remove the brace bars upon receipt of the cargo, thereby to afford the forklift truck or other transport vehicle full and complete access to the cargo in order to unload the same.

Each brace bar 15 is positioned where desired by the operator by manual operation. As indicated previously, the particular placement of a brace bar is determined by the size, quantity, and configuration of the cargo 11 stored within the container 10. The manner in which the brace bar 15 is inserted in position and removed from position will be more fully understood when reference is had to FIGS. 3 through 5 of the drawings illustrating the details of construction of the brace bar 15 and related assemblies.

In FIG. 3, the brace bar 15 is illustrated, along with related assemblies. The brace bar 15 is shown to be formed by a tubular member 17 which is substantially rectangular in configuration and cross section (FIG. 4). When in use, the brace bar 15 is oriented to have an upper end 19 and a lower end 21. It will be observed that there are provided a pair of upper internal rails 23 and a pair of lower internal rails 25, both pairs of rails 23 and 25 respectively being formed integrally with the brace bar 15 and extending inwardly within the hollow interior confines of the brace bar 15. It will further be observed that the two pairs of rails 23 and 25 are in vertical alignment one with respect to the other such as to form an upper lock channel 27 and a lower lock channel 29. Finally, the brace bar 15 is also provided with pin apertures 31 (FIG. 5) for a purpose to be more fully defined hereinafter.

It will also be observed that the brace bar 15 is oriented such that it has opposed lateral ends such that the brace bar 15 will extend from and between the side walls of the standard cargo container 10. Essentially, both of the lateral ends of the brace bar 15 are identical with the exception of the pin apertures whose function and placement will be described more fully hereinafter.

In the preferred embodiment, it is contemplated that the brace bar 15 will be formed as an extrusion such that the upper internal rails 23 and lower internal rails 25 are formed integrally with the brace bar 15. It is further contemplated that in the ideal embodiment, the brace bar 15 may be formed of an aluminum alloy which provides both light weight as well as structural rigidity, and ease of manufacture. In any event, the particular material employed to manufacture the brace bar 15 is not deemed of critical importance to the present invention so long as a material is selected which permits the formation of the upper internal rails 23 and lower internal rails 25 as an integral part of the brace bar 15 during the manufacturing operation.

As indicated previously, the upper and lower internal rails 23 and 25 respectively form upper and lower lock channels 27 and 29 respectively. Each of these channels is provided with a latch mechanism 35 which is constructed in a manner to permit the nesting engagement of the corresponding latch mechanism 35 within the upper and lower channels 27 and 29 respectively, at both of the terminal ends of the brace bar 15, in the manner illustrated in FIGS. 3 and 4 of the drawings.

The details of the latch mechanism 35 are more particularly shown in FIGS. 4 and 5 of the drawings. It will be observed that each latch mechanism 35 is formed by a pair of outer support plates 37, a pair of inner latch plates 39 and a central plate 41. The plates 37, 39, and 41 are each elongate flat plates and held in stacked relationship along the flat axis by means of a plurality of rivet pins 43. As more particularly shown in FIG. 5 of the drawings, the outer support plates 37 terminate at their outer ends at a point spaced inwardly from the terminal point of the inner latch plates 39 thereby forming an extension portion designated by the numeral 45. It will be observed that at the lower end of the extension portion 45 is a rectangular notch 47 which forms a portion of the latch mechanism to secure the same within a lock slot 14 in a cargo container 10. In addition, it will be observed that the central plate 41 includes an upper cut-away portion thereby to accommodate the latch plate 50 in sandwich relation between the two inner latch plates 39. The latch plate 50 is formed by a body section 52 having an upper arcuate hold flange 53, and having a finger latch 54 extending upwardly therefrom. The latch plate 50 and central plate 41 are so sized that there is a space or gap between the inner edge of the latch plate 50 and the outer terminal end of the central plate 41 to accommodate the positioning of a small leaf spring 56 therebetween. The latch plate 50 is held in pivotal arrangement between the two inner latch plates 39 by means of a rivet pin 58. It will therefore become apparent that the movement of the finger latch 54 and the latch plate 50 is permitted only toward the brace bar 15, the leaf spring 56 tending to normally urge the latch plate 50 to a forward or exterior direction, away from the brace bar 15.

The latch mechanism 35 is shown to further include a pin slot 60 extending through the main body portion of the plates 37, 39, and 41. As shown in FIG. 3 of the drawings, the latch mechanism 35 positioned at one terminal end of the brace bar 15 held in fixed position by means of a pair of holding pins 62, one of each of the holding pins 62 positioned at the fore and aft portions of the pin slot 60. The holding pins 62 extend through the brace bar 15 and are fixedly secured to the brace bar 15 by means of rivet heads in a manner common in the art. In this manner, the one latch mechanism 35 at one terminal end of the brace bar 15 is securely held in position and is not permitted any horizontal sliding movement within the brace bar 15. On the other hand, the opposed latch mechanism 35 at the opposed terminal end of the brace bar 15 is shown to be held in the opposed lock channels 27 and 29 respectively by means of a single holding pin 64 (FIG. 5), the single holding pin extending through the apertures 31 in the brace bar 15, and through the pin slot 60 in the latch mechanism 35. Once again, the holding pin 64 is fixedly secured to the brace bar 15 by means of rivet heads in a manner known in the art. It will therefore be apparent that the latch mechanism 35 at one end of the brace bar 15 is fixedly secured in position while the opposed latch mechanism at the opposed end of the same brace bar 15 is permitted horizontal sliding movement by virtue of the single holding pin 64 positioned therethrough. This feature permits the latching and unlatching of the brace bar 15 when the same is to be employed within a cargo container 10 or removed therefrom.

The operability of the subject brace bar 15 may now be discussed in detail. As shown in FIG. 1 of the drawings, a brace bar 15 will be positioned between opposed lock rails 12 at any pre-selected vertical height, of course depending upon the positioning of the lock rails 12 within the cargo container 10. It will be appreciated that while FIG. 1 shows a series of three such rails along the vertical height of the cargo container 10, several of such rails may be similarly positioned in order to afford the operator maximum useage of a brace bar 15. In any event, in order to latch the brace bar 15 into position, the rectangular notch 47 of the fixed latch mechanism 35 is positioned onto the lower lip of the lock slot 14 and the bar urged forwardly until the arcuate hold flange 53 slides under the upper lip of the lock slot 14 with the finger latch 54 against the outer face of the slot 14. The opposed end of the latch bar is then secured into position by slideably moving the opposed latch mechanism 35 until the opposed rectangular notch 47 may be positioned onto the lower lip of the opposed lock slot 14 and the arcuate hold flange 53 slid under the upper lip of the slot 14 with the opposed finger latch 54 against the outer face of the slot 14. The principal holding action of the brace bar 15 is maintained by the engagement of the rectangular notches 47 with the lower lip of the lock slots 14 while the arcuate hold flanges 53 simply prevent any untoward movement of the brace bar 15 once secured in position. Removal of the brace bar 15 is accomplished by physically urging the finger latch 54 rewardly away from the lock slots 14 such that the arcuate hold flanges 53 are moved away from under the upper lip of the lock slots 14. With the arcuate hold flanges 53 out of holding position, the rectangular notches 47 may be removed from holding engagement with the lower lips of the lock slots 14 thereby to disengage the brace bar 15 from both lock rails 12. It is therefore apparent that the principal holding action is accomplished by the rectangular notches 47 positioned over the lower lips of the lock slots 14 while the arcuate hold flanges 53 prevent the upward disengaging movement of the brace bar 15 once positioned in bracing position.

It will further be appreciated that where desired, and in other embodiments of the invention, these lock slots 14 may be constructed such that a portion of the slots 14 can unlatch in order to permit quick and easy removal of the latch mechanism 35 from engagement with a corresponding lock slot 14. However, in the embodiment as described herein, it is intended that the locking function is accomplished by the notches 47 and arcuate hold flanges 53 of the latch plate 50, and removal of the brace bar 15 is accomplished by simply biasingly urging the finger latches 54 rearward to move the arcuate hold flanges 53 out of holding position. Hence, the hold flanges 53 insure that during transit, the brace bar 14 can withstand a great deal of fibration and shaking motion without disconnecting itself.

In FIGS. 6, 7 and 8 of the drawings, an alternate embodiment of the cargo brace bar and latch mechanism of the present invention is illustrated. In this particular embodiment, an alternate form of a cargo brace bar, generally referred to by the numeral 65 is provided. The construction of the cargo brace bar 65 is similar in overall outward appearance to cargo brace bar 15 described hereinabove. It will be observed that cargo brace bar 65 shown to be formed by tubular member 67 which is substantially rectangular in configuration and cross-section. Once again, the brace bar 65 is oriented to have an upper end 69 and a lower end 71. It will be observed that there are provided a pair of upper internal rails 73 and a pair of lower internal rails 75, both pairs of rails 73 and 75 respectively being formed integrally with the brace bar 65. However, in this embodiment it will be noted that the upper and lower internal rails 73 and 75 respectively, are formed adjacent to the interior forners of the brace bar 65 and extend inwardly toward the hollow portion of the brace bar 65. This construction is intended to nestignly mate with the corresponding latch mechanism 85 as will be more specifically described hereinafter.

It will further be observed that the two pairs of upper and lower rails 73 and 75, respectively, are in vertical alignment one with respect to the other such as to form an upper lock channel 77 and a lower channel 79. It will also be observed that the brace bar 65 is similarly provided with pin apertures 81 which accommodate holding pins 84 therethrough.

As was evident with regard to the other embodiment of this invention, the brace bar 65 is oriented such that it has opposed lateral ends such as the brace bar 65 and will extend from and between the side walls of the standard cargo container 10. Again, both of the lateral ends of the brace bar 65 are basically identical in construction and function.

It will also be apparent that the brace bar 65 is intended to be formed as an extrusion as was true with the brace bar 15, such that the upper internal rails 73 and lower internal rails 75 are formed integrally with the brace bar 65. In short, it is contemplated that the brace bar 65 is constructed in a manner similar to brace bar 15 and would be formed of the similar type material.

As indicated in connection with the alternate embodiment described hereinabove, the upper and lower internal rails 73 and 75, respectively, form upper and lower lock channels 77 and 79, respectively. Each of these channels is provided with a latch mechanism 85, which is constructed in a manner to permit the nesting engagement of the corresponding latch mechanism 85 within the upper and lower channels 77 and 79 respectively, and at both terminal ends of the brace bar 65. This configuration is shown in FIG. 6 of the drawings.

The details of the latch mechanism 85 are more particularly shown in FIGS. 7 and 8 of the drawings. It will be observed that each latch mechanism 85 is formed by a pair of outer support plates 87, and inner plate 89, and a latch plate 91. The plates 87, 89 and 91 are each elongate flat plates and held in stack relationship along the flat axis by means of a plurality of rivet pins 93.

In the embodiment of the latch mechanism 85 shown in FIGS. 7 and 8 of the drawings, the outer support plates 87 are shown to have upper and lower guide flanges 95 and 97 respectively. As is shown in FIGS. 7 and 8 of the drawings, the upper and lower guide flanges 95 and 97 are shown to extend laterally outwardly away from the corresponding outer support plates 87, each of the flanges 95 and 97 terminating in a turned lateral rail 96 and 98, respectively.

As is more particularly exemplified in FIG. 7 of the drawings, the overall lateral width measured from the respective turned lateral rails 96 and 98, respectively of the two outer support plates 87, is such as to nestingly mate within the hollow of the cargo of brace bar 65, with the latch mechanism 85 riding between the upper and lower internal rails 73 and 75, respectively. It will be observed that the interior portion of the cargo brace bar 65 further includes upper and lower corner thickened sections 74 and 76, respectively, which permit the upper and lower turned lateral rails 96 and 98 to ride against as the latch mechanism 85 is reciprocated into and out of the cargo brace bar 65.

In this particular embodiment of the invention, it has been found that a higher degree of lateral as well as vertical stability is achieved since the latch mechanism 65 will have a broader expanse of support once the latch mechanism 85 is secured in position in the manner described in connection with the cargo brace and bar as shown and described in connection with FIGS. 1 through 5 of the drawings.

It will be observed that at the lower end of the stack plates 87, 89 and 91, is a rectangular notch 99 which forms the portion of the latch mechanism to secure the same within a lock slot 14 in a cargo container 10. Similarly, it will be observed that the latch plate 91 includes an upper cutaway portion generally designatedby the numeral 101 thereby to accommodate the latch plate 103 therein. As was described in connection with the previous embodiment, the latch plate 103 is formed by body section 104 having an upper arcuate cold flange 105, and having a finger latch 106 extending upwardly therefrom. The cutaway portion 101 also includes a small leaf spring 108 which operates to return the latch plate 103 to its forward or exterior position, away from the brace bar 65. This movement is identical as was described in connection with the previous embodiment of the brace bar above.

The latch mechanism 85 is shown to further include a pin slot 110 extending through the main body portion of the plates 87, 89 and 91, respectively. As shown in FIG. 6 of the drawings, each of the latch mechanisms 85 located at the opposed ends of the brace bar 65, are held in position within the brace bar 65 by inserting the holding pins 84 through the respective pin slots 110. As was described in connection with the previous embodiment, the holding pins 84 extend through the brace bar 65 and are fixedly secured to the bract bar 65 by means of rivet heads in a manner common in the art. In this manner, each of the latch mechanisms 85 at the terminal ends of the brace bar 65 is permitted horizontal sliding movement within the brace bar 65. Alternatively, one of the latch mechanisms 85 may be held in fixed position by simply riveting the same to the brace bar 65.

In terms of operability, the brace bar assembly 65 including the latch mechanisms 85, as shown in FIGS. 6 through 8 of the drawings, operates in the same manner as was evident with respect to the previous embodiment. The differences between the two embodiments relate to the methods of manufacture which in turn, have an effect upon the horizontal as well as vertical stability of the latch mechanisms when in use in a cargo container. In the embodiment depicted in FIGS. 6 through 8 of the drawings, in view of the fact that the latch mechanism 85 is stable from end to end due to the manner in which the same is positioned within the corresponding brace bar 65, it is considered that when in use, the overall brace bar 65 will have greater lateral as well as vertical stability.

It will be appreciated that the brace bar of the present invention permits the use of the subject brace bar for double decking purposes. It will be appreciated that in modern cargo containers, cargo is often double-decked within the container by the use of boltable decks provided within the container. Hence, where upper and lower decks are provided to retain cargo, brace bars in accordance with the present invention may be employed at the various levels within the cargo container in order to brace the cargo in position regardless of the number of decks employed.

It will further be appreciated that while the latch mechanism assemblies of the brace bar of the present invention have been references as being secured by means of rivets, other means of fastening the elements together may be employed. For example, the parts may be cast integrally, the same may be welded together, or any other means of joining such materials together may be employed which will accomplish the result of retaining the elements in fixed relationship one of the other as described herein. Clearly, any appropriate joining means may be utilized so long as the resulting brace bar is constructed in accordance with the teachings herein.

It will be appreciated that by virtue of the present invention, an improved form of a brace bar assembly is provided. In summary, the brace bar assembly of the present invention provides a unitarily formed brace bar formed with a pair of upper and lower rails thereby to provide lock channels at both ends of the brace bar, and a latch mechanism which is formed simply by a plurality of flat plates which are riveted together and having a finger latch held in sandwich relationship therebetween. The finger latch is riveted into position such as to be pivotally moveable only in an interiorly directed arc and normally urged into an upward lock position by means of a leaf spring. It will therefore be appreciated that the provision of the upper and lower rails provide lock channels such that the lock mechanism may be easily inserted into position within the brace bar without the need of any extraneous guides or supports or other such elements as are now known in the art. Furthermore, the provision of a brace bar having one of the latch mechanisms in fixedly secured relationship with respect to the brace bar while the other latch mechanism at the opposed terminal end of the brace bar is permitted horizontally slideable movement further facilitates the ability to latch and unlatch the brace bar from engaged position with a corresponding cargo container.

It will further be noted that the latch mechanisms on each terminal end of the same brace bar are of the same construction thus avoiding the necessity of separate manufacture for the two latch mechanisms. In short, by employing a double holding pin arrangement for securing the fixed latch mechanism in relationship to the brace bar, the latch mechanism intended as the fixedly secured latch mechanism may take on the same construction including the pin slot as the opposed latch mechanism while still obtaining the benefits of the present invention. Clearly, it would be economically expensive to be manufacturing a right and left latch mechanism eliminating from one the pin slot and incorporating the pin slot in the other and hence, the double holding pin arrangement insures that latch mechanisms may be made one identical to the other while still obtaining the benefits set forth herein.

While there has been described what is at present considered to be the preferred embodiments of the invention, it will be understood that various modifications may be made therein and it is intended to cover in the appended claim all such modifications as fall within the true spirit and scope of the invention.

What is claimed is:

1. A cargo brace bar assembly for use in conjunction with a cargo container of the type provided with a plurality of horizontally aligned vertically elongate bar slots, comprising, in combination,
   - a tubular brace bar of unitary construction and having a central hollow extending along the entire length thereof from the longitudinal ends of said bar,
   - said brace bar so oriented so as to have an upper portion and a lower portion,
   - said upper and lower portions each provided with a pair of spaced rails formed along the interior surfaces thereof and extending within the hollow of said brace bar at least adjacent said longitudinal ends thereof, said upper and lower pairs of rails being in vertical alignment and forming a lock channel,
   - at least one lock assembly formed by a main body portion having a horizontally elongate configuration with interior and exterior ends and sized so as to be slideably positionable and received within said corresponding lock channel at the interior end of said lock assembly,
   - the exterior end of said main body portion of said lock assembly provided with a latch mechanism including a lower notched end portion and an upper end portion having a spring loaded finger latch thereon and holding means associated therewith
   - said brace bar and lock assembly including cooperating lock holding means to hold each of said lock assemblies in position at each end of said brace bar such that at least one of said lock assemblies is slideably moveable within the corresponding lock channel,
   - whereby said upper and lower pairs of rails forming the support for said lock assemblies constitute supporting elements, and operate by permitting said brace bar to be positioned within a cargo container by inserting said latch mechanism at one end of said brace bar within a selected elongate bar slot, and then positioning the latch mechanism at the opposed end of said brace bar within a horizontally aligned elongate bar slot, each of said latch mechanisms engaging said bar slots by positioning the lower notched end on the bottom lip of the bar slot and moving said holding means into holding position to engage said brace bar with a corresponding bar slot thereby to secure the brace bar in position.

2. The brace bar assembly as set forth in claim 1 above, wherein said brace bar is substantially rectangular in cross section.

3. The brace bar assembly as set forth in claim 2 above, wherein each of said pairs of rails extend along the entire interior length of said brace bar and are formed unitarily with said brace bar.

4. The brace bar assembly as set forth in claim 1 above, wherein said lock holding means is formed by a pair of apertures positioned in said brace bar adjacent each of the ends thereof, said apertures being positioned in horizontal alignment with respect to one another, and at least one of said lock assemblies provided with a horizontal slot in the main body portion thereof, and a pin extending through said brace bar apertures and through said main body slot such that such lock assembly is permitted horizontal sliding movement to the extent of the confines of said slot.

5. The brace bar assembly as set forth in claim 1 above, wherein said lock assembly comprises a main body portion formed by a plurality of horizontally elongate flat plates positioned in flat stacked orientation, said plates being fixedly secured together by pin means, and said latch mechanism comprising a flat piece finger latch extending upwardly for a distance beyond the top end of said lock assembly and pivotally mounted between adjacent ones of said flat plates, and further including an arcuate hold flange positioned adjacent said finger latch and constructed to maintain a lock holding posture during use.

6. The brace bar assembly as set forth in claim 5 above, wherein said lock assembly is formed by a series of five flat plates, including a pair of outer support plates positioned on the outer sides of said lock assembly, a pair of inner latch support plates having the outer ends thereof extending outwardly beyond the outer ends of said pair of support plates and including said notched end of the lower end thereof and pivotally securing said finger latch therebetween and above said lower nothed end, a central plate having the outer end thereof terminating at a point spaced inwardly from the outer end of said lock assembly and in horizontal alignment with said finger latch thereby to accommodate a latch spring interposed between said central plate and said finger latch, and a plurality of rivet pins extending through said plates thereby to fixedly secure said plates together into a solid assembly.

7. The brace bar assembly as set forth in claim 1 above, wherein said brace bar is provided with a first lock assembly fixedly secured in said lock channel at one end thereof, and the opposed end of said brace bar is provided with a second lock assembly which is horizontally slideably moveable in said lock channel.

8. The brace bar assembly as set forth in claim 1 above, wherein said spring loaded finger latch is pivotally moveable along an arc only in the direction of the interior ends of said lock assembly, the pivotal movement of said finger latch causing concomitant movement of said holding means into and out of holding engagement with a corresponding bar slot. be slideably positionable and received within said corresponding lock channel at the interior end of said lock assembly,
the exterior end of said main body portion of said lock assembly provided with a latch mechanism including a lower notched end portion and an upper end portion having a spring loaded finger latch thereon and holding means associated therewith
said brace bar and lock assembly including cooperating lock holding means to hold each of said lock assemblies in position at each end of said brace bar such that at least one of said lock assemblies is slideably moveable within the corresponding lock channel,
whereby said upper and lower pairs of rails forming the support for said lock assemblies constitute supporting elements, and operate by permitting said brace bar to be positioned within a cargo container by inserting said latch mechanism at one end of said brace bar within a selected elongate bar slot, and then positioning the latch mechanism at the opposed end of said brace bar within a horizontally aligned elongate bar slot, each of said latch mechanisms engaging said bar slots by positioning the lower notched end on the bottom lip of the bar slot and moving said holding means into holding position to engage said brace bar with a corresponding bar slot thereby to secure to brace bar in position.

9. A cargo brace bar assembly for use in conjunction with a cargo container of the type provided with a plurality of horizontally aligned vertically elongate bar slots comprising, in combination,
a tubular brace bar of unitary construction having a central hollow extending along the entire length thereof from the longitudinal lengths of said bar,
said brace bar so oriented so as to have side walls joined togehter at corners to form a unitarily constructed tubular brace bar,
said corners each provided with a pair of spaced rails formed along the interior surface thereof, for a determined length along the interior surfaces thereof, and extending within the hollow of said brace bar, at least adjacent said longitudinal ends thereof, said corner rails being in positional alignment with its adjacent neighboring corner rails and forming a lock channel,
at leat one lock assembly formed by main body portion having a horizontally elongate configuration with interior and exterior ends and sided so as to be slideably positionable and received within said corresponding lock channel at the interior end of said lock assembly,
the exterior end of said main body of said lock assembly provided with a latch mechanism including a lower notched portion end and an upper end portion and having a spring loaded finger latch thereon and holding means associated therewith,
said brace bar and lock assembly including cooperating lock holding means to hold said entire lock assembly in position at each end of said brace bar such that at least one of said lock assemblies is slideably movable within the corresponding lock channel,
whereby said upper and lower pairs of rails forming the support for said lock assemblies constitutes supporting elements, and operate by permitting said brace bar to be ositioned within a cargo container by inserting said latch mechanism at one end of said brace bar within a selected elongate bar slot, and then positioning the latch mechanism at the opposed end of said brace bar within a horizontally aligned elongate bar slot, each of said latch mechanisms engaging said bar slots by positioning the lower notched end on the bottom lip of the bar slot moving said holding means into holding position to engage said brace bar with a corresponding bar slot thereby to secure the brace bar in position.

10. The cargo brace bar assembly as set forth in claim 9 above, wherein said cargo brace bar further includes thickened sections adjacent each of said upper and lower pairs of rails, said thickened portions extending inwardly for a short distance such that each of the four interior corners of said cargo brace bar are formed with both upper and lower rails and upper and lower thickened sections at each of the four interior corners thereof.

11. The cargo brace bar assembly as set forth in claim 9 above, wherein said lock assembly comprises a main body portion formed by a plurality of horizontally elongate flat plates positioned in flat stack orientation, said plates being fixably secured together by pin means, and said latch mechanism comprising a flat piece finger latch extending upwardly for a distance beyond the top end of said lock assembly and pivotally mounted between adjacent wants of said flat plates, and further including an arcuate hold flange position adjacent said finger latch and constructed to maintain a lock holding posture during use.

12. The brace bar assembly as set forth in claim 11 above, wherein said lock assembly is formed by a series of four flat plates, including a pair of outer support plates positioned on outer sides of said lock assembly, an inner plate, and a latch plate, said inner and latch plates respectively being positioned between said pair of outer support plates, said latch plate including a cutaway portion to accommodate a latch spring interposed between said plates, and a plurality of rivet pins extending through said plates thereby to fixedly secure said plates together into a solid assembly.

13. The cargo brace bar assembly as set forth in claim 12 above, wherein each of said outer support plates includes upper and lower guide flanges extending laterally outwardly therefrom, each of said upper and lower guide flanges terminating in a turned lateral rail, whereby when said lock assembly is positioned within a corresponding cargo brace bar, said upper and lower guide flanges are in sliding contact with said upper and lower internal rails respectively, and said turned lateral rails are in sliding contact with said laterally thickened sections of said cargo brace bar, whereby said lock assembly achieves a high degree of lateral and vertical stability when in use.

* * * * *